US012607824B2

(12) United States Patent
Xia et al.

(10) Patent No.: US 12,607,824 B2
(45) Date of Patent: *Apr. 21, 2026

(54) METHOD, APPARATUS FOR LENS BARREL DISTANCE ADJUSTMENT DEVICE AND COMPUTER MEDIUM

(71) Applicant: Beijing Zitiao Network Technology Co., Ltd., Beijing (CN)

(72) Inventors: Jiu Xia, Beijing (CN); Guanghui Liu, Beijing (CN); Kaiyang Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/927,048

(22) Filed: Oct. 25, 2024

(65) Prior Publication Data

US 2025/0052977 A1 Feb. 13, 2025

Related U.S. Application Data

(63) Continuation of application No. 18/644,951, filed on Apr. 24, 2024, now Pat. No. 12,153,281, which is a
(Continued)

(30) Foreign Application Priority Data

Jan. 30, 2022 (CN) .......................... 202210114629.3

(51) Int. Cl.
G09G 5/00 (2006.01)
G02B 7/12 (2021.01)
(Continued)

(52) U.S. Cl.
CPC ........... G02B 7/12 (2013.01); G02B 27/0093 (2013.01); G02B 27/0172 (2013.01);
(Continued)

(58) Field of Classification Search
CPC ...... G02B 7/12; G02B 27/00; G02B 27/0093; G02B 27/01; G02B 27/017;
(Continued)

(56) References Cited

U.S. PATENT DOCUMENTS 5,486,841 A 1/1996 Hara et al.
10,416,455 B2 9/2019 Yi et al.
(Continued)

FOREIGN PATENT DOCUMENTS

CN 105425397 A 3/2016
CN 106686365 A 6/2017
(Continued)

OTHER PUBLICATIONS

European Search Report for EP Patent Application No. 23745900.3, Issued on Feb. 21, 2025, 9 pages.

*Primary Examiner* — Joe H Cheng
(74) *Attorney, Agent, or Firm* — Faegre Drinker Biddle & Reath LLP

(57) ABSTRACT

An apparatus, method for lens barrel distance adjustment, device and computer medium are provided. The method includes: obtaining a pupillary distance of a user; obtaining a first output voltage determined by a hall sensor; in response to that the first output voltage indicates that an absolute value of a difference value between a distance between left and right lens barrels of a head-mounted device and the pupillary distance of the user is greater than a predetermined threshold, sending a control instruction to an adjustment circuit, causing the adjustment circuit to adjust a distance between the left and right lens barrels based on the control instruction. The hall sensor and the adjustment circuit are provided on the head-mounted device.

17 Claims, 4 Drawing Sheets

Related U.S. Application Data continuation of application No. PCT/CN2023/071359, filed on Jan. 9, 2023.

(51) Int. Cl.
   *G02B 27/00*     (2006.01)
   *G02B 27/01*     (2006.01)

(52) U.S. Cl.
   CPC .. *G02B 27/0176* (2013.01); *G02B 2027/0138* (2013.01); *G02B 2027/0154* (2013.01)

(58) Field of Classification Search
   CPC ........... G02B 27/0172; G02B 27/0176; G02B 2027/0132; G02B 2027/0138; G02B 2027/0154; G06F 3/013
   See application file for complete search history.

(56)             References Cited

U.S. PATENT DOCUMENTS

| 10,962,777 | B1 | 3/2021 | Wheelwright et al. |
|---|---|---|---|
| 11,726,338 | B2 | 8/2023 | Franklin et al. |
| 11,977,237 | B2 | 5/2024 | Xia |
| 2017/0344107 | A1 | 11/2017 | Aghara et al. |
| 2018/0224625 | A1 | 8/2018 | Tseng et al. |
| 2020/0272022 | A1 | 8/2020 | Myhre et al. |
| 2021/0132397 | A1 | 5/2021 | Stellman et al. |
| 2021/0405396 | A1 | 12/2021 | Ma et al. |
| 2022/0373799 | A1 | 11/2022 | Wang |

FOREIGN PATENT DOCUMENTS

| CN | 207706338 | U | 8/2018 |
|---|---|---|---|
| CN | 110398840 | A | 11/2019 |
| CN | 111025637 | A | 4/2020 |
| CN | 210835442 | U | 6/2020 |
| CN | 113419344 | A | 9/2021 |
| CN | 113489966 | A | 10/2021 |
| CN | 113709622 | A | 11/2021 |
| CN | 113985610 | A | 1/2022 |
| EP | 4435492 | A1 | 9/2024 |

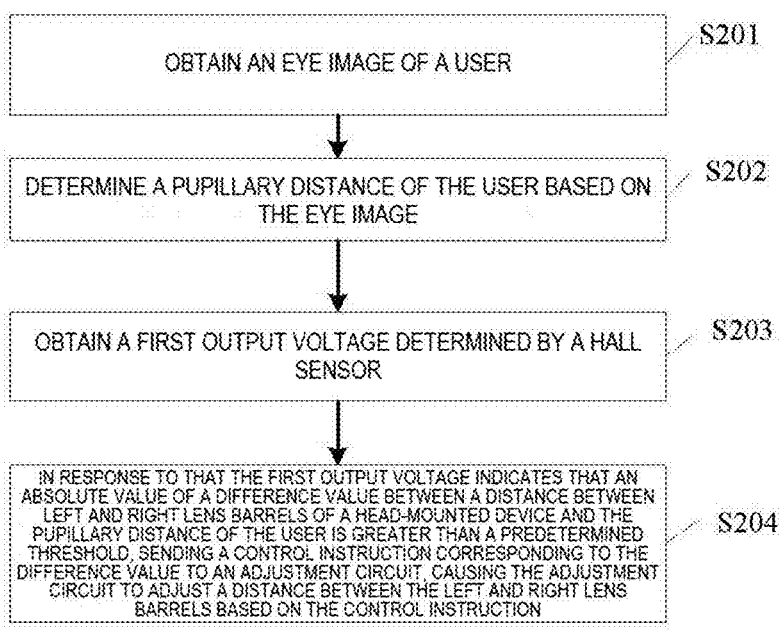

OBTAIN AN EYE IMAGE OF A USER — S201

DETERMINE A PUPILLARY DISTANCE OF THE USER BASED ON THE EYE IMAGE — S202

OBTAIN A FIRST OUTPUT VOLTAGE DETERMINED BY A HALL SENSOR — S203

IN RESPONSE TO THAT THE FIRST OUTPUT VOLTAGE INDICATES THAT AN ABSOLUTE VALUE OF A DIFFERENCE VALUE BETWEEN A DISTANCE BETWEEN LEFT AND RIGHT LENS BARRELS OF A HEAD-MOUNTED DEVICE AND THE PUPILLARY DISTANCE OF THE USER IS GREATER THAN A PREDETERMINED THRESHOLD, SENDING A CONTROL INSTRUCTION CORRESPONDING TO THE DIFFERENCE VALUE TO AN ADJUSTMENT CIRCUIT, CAUSING THE ADJUSTMENT CIRCUIT TO ADJUST A DISTANCE BETWEEN THE LEFT AND RIGHT LENS BARRELS BASED ON THE CONTROL INSTRUCTION — S204

FIG. 2

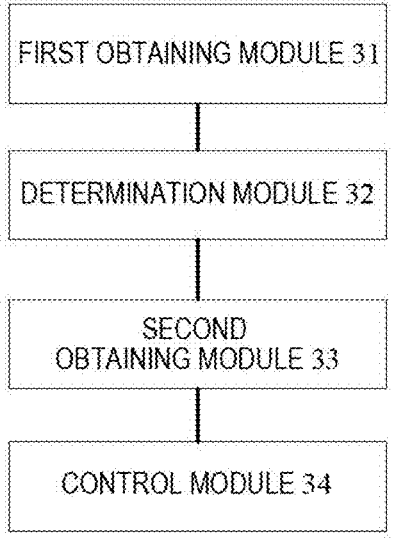

FIRST OBTAINING MODULE 31

DETERMINATION MODULE 32

SECOND OBTAINING MODULE 33

CONTROL MODULE 34

FIG. 3

METHOD, APPARATUS FOR LENS BARREL DISTANCE ADJUSTMENT DEVICE AND COMPUTER MEDIUM

CROSS REFERENCE

This application is a continuation of U.S. patent application No. U.S. Ser. No. 18/644,951 filed on Apr. 24, 2024, now U.S. Pat. No. 12,153,281 B2, which is a continuation of International Patent Application No. PCT/CN2023/071359, filed on Jan. 9, 2023, which is based on and claims the priority to Chinese Patent Application No. 202210114629.3 filed with the China National Intellectual Property Administration (CNIPA) on Jan. 30, 2022, the disclosures of which are incorporated herein by reference in their entireties.

FIELD

The present disclosure relates to the technical field of virtual reality, and in particular relates to a method, apparatus for lens barrel distance adjustment, device and computer medium.

BACKGROUND

A Virtual Reality (VR) device is a device that can create and for users to experience a virtual world. It can generate a simulation environment based on a computer program and provide a multi-source information fusion, interactive three-dimensional dynamic vision and entity behavior simulation that immerses users in a virtual environment.

With the development and progress of the VR technology, the requirements for the comfort level of VR head-mounted device are getting higher and higher. Since the interpupillary distance of different users will be different, the difference in interpupillary distance leads to different requirements for the distance between the left and right lens barrels of the VR equipment. Therefore, different users need to adjust the distance of the lens barrel when using VR head-mounted device to achieve better visual effect.

In the related art, when the distance between the lens barrel of the left and right lens barrels is adjusted by the user, they need to manually adjust the distance between the left and right lens barrels through a knob, which is a waste of time and has low adjustment efficiency.

SUMMARY

Embodiments of the present disclosure provide an implementation solution that is different from the related art to solve the technical problem in the related art that the adjustment efficiency of the distance adjustment manner between the left and right lens barrels of the head-mounted device is low.

In a first aspect, embodiments of the present disclosure provide an apparatus for lens barrel distance adjustment that comprises a data processing circuit, an adjustment circuit, and a hall sensor, wherein:

The hall sensor is configured to sense a magnetic induction intensity of a magnet related to a distance between left and right lens barrels of a head-mounted device, and output a corresponding first output voltage based on the magnetic induction intensity.

The data processing circuit is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction.

The adjustment circuit is configured to receive the control instruction and adjust a distance between the left and right lens barrels based on the control instruction.

In a second aspect, embodiments of the present disclosure provide a method for adjusting a lens barrel distance that comprises:

obtaining an eye image of a user;

determining a pupillary distance of the user based on the eye image;

obtaining a first output voltage determined by a hall sensor;

in response to that the first output voltage indicates that an absolute value of a difference value between a distance between left and right lens barrels of a head-mounted device and the pupillary distance of the user is greater than a predetermined threshold, sending a control instruction corresponding to the difference value to an adjustment circuit, causing the adjustment circuit to adjust a distance between the left and right lens barrels based on the control instruction;

wherein, the hall sensor and the adjustment circuit are provided on the head-mounted device.

In a third aspect, embodiments of the present disclosure provide a head-mounted device that comprises a camera group, a data processing circuit, an adjustment circuit, and a hall sensor, wherein:

The camera group is configured to take an eye image of a user.

The hall sensor is configured to sense a magnetic induction intensity of a magnet related to a distance between left and right lens barrels of a head-mounted device, and output a corresponding first output voltage based on the magnetic induction intensity.

The data processing circuit is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction.

The adjustment circuit is configured to receive the control instruction and adjust a distance between the left and right lens barrels based on the control instruction.

In a fourth aspect, embodiments of the present disclosure provide an apparatus for lens barrel distance adjustment that comprises:

a first obtaining module configured to obtain an eye image of a user;

a determination module configured to determine a pupillary distance of the user based on the eye image;

a second obtaining module configured to obtain a first output voltage determined by a hall sensor;

a control module configured to in response to that the first output voltage indicates that an absolute value of a difference value between a distance between left and right lens barrels of a head-mounted device and the pupillary distance of the user is greater than a predetermined threshold, send a control instruction corresponding to the difference value to an adjustment circuit, causing the adjustment circuit to adjust a distance between the left and right lens barrels based on the control instruction;

wherein, the hall sensor and the adjustment circuit are provided on the head-mounted device.

In a fifth aspect, embodiments of the present disclosure provide an electronic device that comprises:

a processor; and a memory configured to store executable instruction of the processor;

wherein the processor is configured to execute any method in the second aspect or the possible implementation manner of the second aspect by executing the executable instruction.

In a sixth aspect, embodiments of the present disclosure provide a computer-readable storage medium on which a computer program is stored, the computer program, when executed by a processor, implementing any method in the second aspect or the possible implementation manner of the second aspect.

In a seventh aspect, embodiments of the present disclosure provide a computer program product that comprises a computer program, when executed by a processor, implementing any method in the second aspect or the possible implementation manner of the second aspect.

The present disclosure provides an apparatus for lens barrel distance adjustment, which specifically comprises: a data processing circuit, an adjustment circuit, and a hall sensor, wherein: the hall sensor is configured to sense a magnetic induction intensity of a magnet related to a distance between left and right lens barrels of a head-mounted device, and output a corresponding first output voltage based on the magnetic induction intensity: the data processing circuit is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction; the adjustment circuit is configured to receive the control instruction and adjust a distance between the left and right lens barrels based on the control instruction. According to the circuit of the present disclosure, the distance between the left and right lens barrels can be automatically adjusted according to interpupillary distance of the user, the efficiency of adjusting the distance between the left and right lens barrel is improved, and the user experience is also improved.

BRIEF DESCRIPTION OF THE DRAWINGS

In order to more clearly illustrate the technical solutions in the embodiments of the present disclosure or related technologies, the drawings that need to be used in the description of the embodiments or related technologies will be briefly introduced below. Obviously, the drawings in the following description are some embodiments of the present disclosure, and for a person of ordinary skill in the art can also obtain other drawings based on these drawings without exerting creative efforts. In the drawings:

FIG. 2 is a schematic flowchart of a method for lens barrel distance adjustment provided according to an embodiment of the present disclosure;

FIG. 3 is a schematic structural diagram of an apparatus for lens barrel distance adjustment provided according to an embodiment of the present disclosure;

DETAILED DESCRIPTION

Figure 1A:
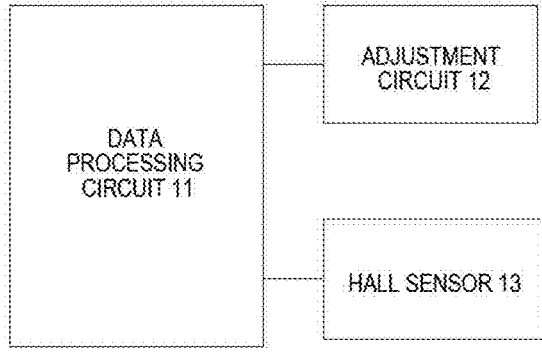
FIG. 1a is a schematic structural diagram of an apparatus for lens barrel distance adjustment provided according to an embodiment of the present disclosure.

Embodiments of the present disclosure are described in detail below, examples of which are illustrated in the drawings. The embodiments described below with reference to the drawings are exemplary and intended to explain the present disclosure and are not to be construed as limitations of the present disclosure.

The terms "first" and "second" and the like in the description, the claims and drawings of the embodiments of the present disclosure are used to distinguish similar objects and not necessarily used to describe a specific order or sequence order. It should be understood that the data used in this way can be interchanged under appropriate circumstances, so that the embodiments of the disclosed embodiments described herein can be implemented, for example, in an order other than those illustrated or described herein. In addition, the terms "include" and "have", and any variations thereof are intended to cover non-exclusive inclusions, e.g., a processes, methods, systems, products, or devices that include a series of steps or units are not necessarily limited to those steps or units that are clearly listed but may include other steps or units that are not expressly listed or inherent to these processes, methods, products or devices.

The technical solution of the present disclosure and how the technical solution of the present disclosure solves the above technical problems will be described in detail below with specific embodiments. The following specific embodiments can be combined with each other, and the same or similar concepts or processes may not be repeated in some embodiments. The following describes embodiments of the present disclosure with reference to the drawings.

FIG. 1a is a schematic structural diagram of an apparatus for lens barrel distance adjustment provided according to an embodiment of the present disclosure. The circuit can be applied to a head-mounted device. Specifically, the circuit can includes: a data processing circuit 11, an adjustment circuit 12, and a hall sensor 13, wherein:

The Hall sensor 13 is configured to sense a magnetic induction intensity of a magnet related to a distance between left and right lens barrels of a head-mounted device, and output a corresponding first output voltage based on the magnetic induction intensity.

The data processing circuit 11 is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction;

The adjustment circuit 12 is configured to receive the control instruction and adjust a distance between the left and right lens barrels based on the control instruction.

In some optional embodiments of the present disclosure, the hall sensor 13 is configured to sense a magnetic induction intensity of a magnet related to a distance between left and right lens barrels of a head-mounted device, and output a corresponding first output voltage based on the magnetic induction intensity. Specifically, the magnet can be arranged at a predetermined position. The predetermined position can be on the lens barrel bracket. Specifically, it can be arranged on the left lens barrel bracket or the right lens barrel bracket. The magnet may move along with adjustment of the position of the left and right lens barrels. At the same time, the hall sensor 13 is fixedly arranged, that is, the position of the hall sensor 13 is fixed and does not move along with the movement of the left and right lens barrels. The hall sensor 13 can be a hall linear sensor, when the magnet moves to different positions, the magnetic induction intensity of the magnet sensed by the hall sensor 13 is different, so that the corresponding first output voltage can be output according to the magnetic induction intensity.

Specifically, the distance between the left and right lens barrels described in this disclosure refers to the distance between the center of the left lens barrel and the center of the right lens barrel.

Further, the storage unit in the data processing circuit 11 may store a corresponding relationship between different first output voltages and the corresponding distances between the left and right lens barrels, and the data processing circuit 11 may determine the distance between the left and right lens barrels corresponding to the currently received first output voltage based on the corresponding relationship, and compare the distance with the pupillary distance of the user. When the first output voltage indicates that an absolute value of a difference value between a distance between the left and right lens barrels and a pupillary distance of a user is greater than a predetermined threshold, the distance between the left and right lens barrels needs to be adjusted, so that the distance is the same as the pupillary distance of the user, or the difference is not greater than the predetermined threshold.

Further, the pupillary distance of the user can be determined by the data processing circuit 11 based on the eye image of the user received from the camera group. The camera group includes a plurality of cameras, and the plurality of cameras can be disposed on an inner side of the head-mounted device, and an inner side of the head-mounted device indicates a side of the user behind the head-mounted device that faces the user.

Optionally, the eye image may be directly received from the camera group that captures an image of the user's eye area, or may be obtained by cropping the user's facial image captured by the camera group, to which the disclosure is not limited.

Further, when the adjustment circuit 12 is configured to adjust the distance between the left and right lens barrels based on the control instruction, the adjustment circuit 12 is specifically configured to drive the left lens barrel and/or the right lens barrel to move based on the control instruction.

Optionally, the adjustment circuit 12 can only drive any one of the left lens barrels and the right lens barrel to move to adjust the distance between the left and right lens barrels or can simultaneously drive the left lens barrel and the lens barrel to move to adjust the distance between the left and right lens barrels.

Figure 1B:
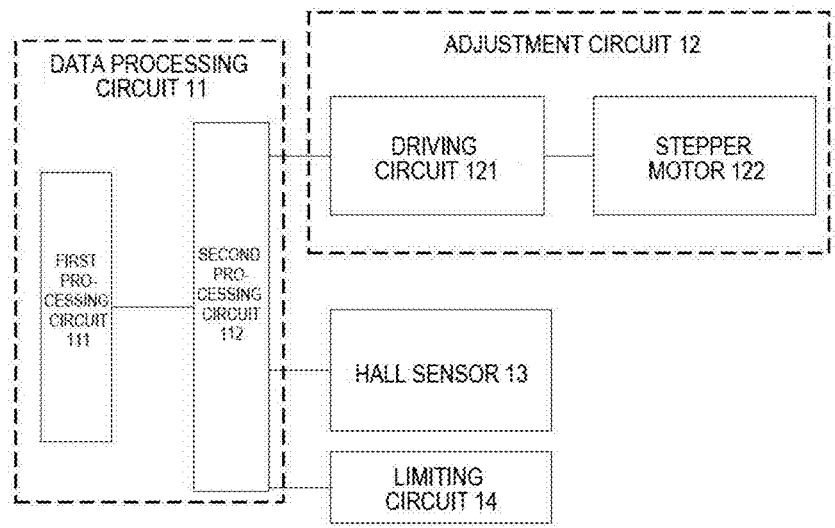
FIG. 1b is a schematic structural diagram of an apparatus for lens barrel distance adjustment provided according to another embodiment of the present disclosure.

Further, as shown in FIG. 1*b*, the adjustment circuit 12 includes a drive circuit 121 and a stepper motor 122: wherein:

The driving circuit 121 is connected to the data processing circuit 11 and the stepper motor 122, and configured to receive the control instruction and generate a corresponding driving signal based on the control instruction.

The stepper motor 122 is configured to drive the left lens barrel and/or the right lens barrel to move based on the driving signal.

Further, the data processing circuit 11 includes: a first processing circuit 111 and a second processing circuit 112, wherein:

The first processing circuit 111 is connected to a camera group and the second processing circuit and configured to obtain an eye image of user from the camera group and determine a pupillary distance of a user based on the eye image.

The second processing circuit 112 is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction.

Wherein, the first processing circuit may be a virtual and extended reality processor, and the second processing circuit may be an MCU (Microcontroller Unit).

In order to further improve the user experience and avoid abnormality in the adjustment process, the lens barrel distance adjustment device further includes: a limiting circuit 14.

The limiting circuit 14 is connected to the data processing circuit 11 and the left lens barrel and/or the right lens barrel and configured to generate a corresponding limit prompt signal when the left lens barrel and/or the right lens barrel move to a corresponding limit position.

The data processing circuit 11 is further configured to stop sending control instruction to the adjustment circuit 12 when the limit prompt signal is detected.

It should be noted that after the limit prompt signal is detected, the adjustment distance corresponding to the stopped control instruction is smaller than the adjustment distance corresponding to the control instruction sent before the limit prompt signal is detected.

The limit prompt signal is a prompt voltage generated when the limiting circuit 14 detects that the left lens barrel or the right lens barrel moves to the corresponding limit position.

Specifically, the limiting circuit 14 can be connected to its corresponding limit position to determine whether the left lens barrel or the right lens barrel moves to the corresponding limit position according to the switching condition of the limit position.

In order to detect the movement of the left lens barrel and/or the right lens barrel in real time, the data processing circuit 11 is further configured to:

After sending the control instruction corresponding to the difference value to the adjustment circuit 12, obtain a second output voltage output by the hall sensor 13; in response to that the second output voltage indicates that an absolute value of a difference value between a distance between the left and right lens barrels and a pupillary distance of a user is not greater than the predetermined threshold, stop sending an instruction to the adjustment circuit 12 that indicates the adjustment circuit 12 to adjust a distance between the left and right lens barrels. The instruction may also be an instruction sent by the data processing circuit 11 after sending the control instruction.

Wherein the second output voltage is the voltage output by the hall sensor after outputting the first output voltage. Specifically; the hall sensor can output a voltage to the data processing circuit 11 according to a certain output cycle.

Further, the camera group in the present disclosure may be an infrared camera group, including a plurality of infrared cameras, and each infrared camera may be configured with an infrared lamp.

Further, the apparatus for lens barrel distance adjustment in the present disclosure can be applied to a head-mounted all-in-one machine.

Furthermore, the present disclosure can determine whether the left lens barrel or the right lens barrel reaches the corresponding limit position through the limiting circuit, or determine whether the left lens barrel or the right lens barrel reaches the corresponding limit position through the output voltage of the hall sensor according to the user requirements, which is not limited in the present disclosure.

Optionally, in the apparatus for lens barrel distance adjustment of the present disclosure, the left lens barrel can independently correspond to a magnet and a hall sensor, and the right lens barrel can correspond to another magnet and a hall sensor. The data processing circuit can determine the distance between the left and right lens barrels through the output voltage of any hall sensor. The data processing circuit can also determine the distance between the left and right lens barrels based on the average output voltage of the two hall sensors. The present disclosure does not limit this.

Specifically, when the left lens barrel independently corresponds to a magnet and a hall sensor, and the right lens barrel corresponds to another magnet and a hall sensor, the bracket of the left and right lens barrels are respectively provided with a magnet, and each magnet corresponds to a magnet with fixed position.

Optionally, in the apparatus for lens barrel distance adjustment of the present disclosure, the left lens barrel can independently correspond to a limiting circuit, and the right lens barrel can correspond to another limiting circuit. The data processing circuit can determine the respective movement progress of the left and right lens barrels by determining whether to detect limiting prompt signal of the limiting circuit corresponding to the distance between the left lens barrel and the right mirror is detected.

Figures 1C, 1D:
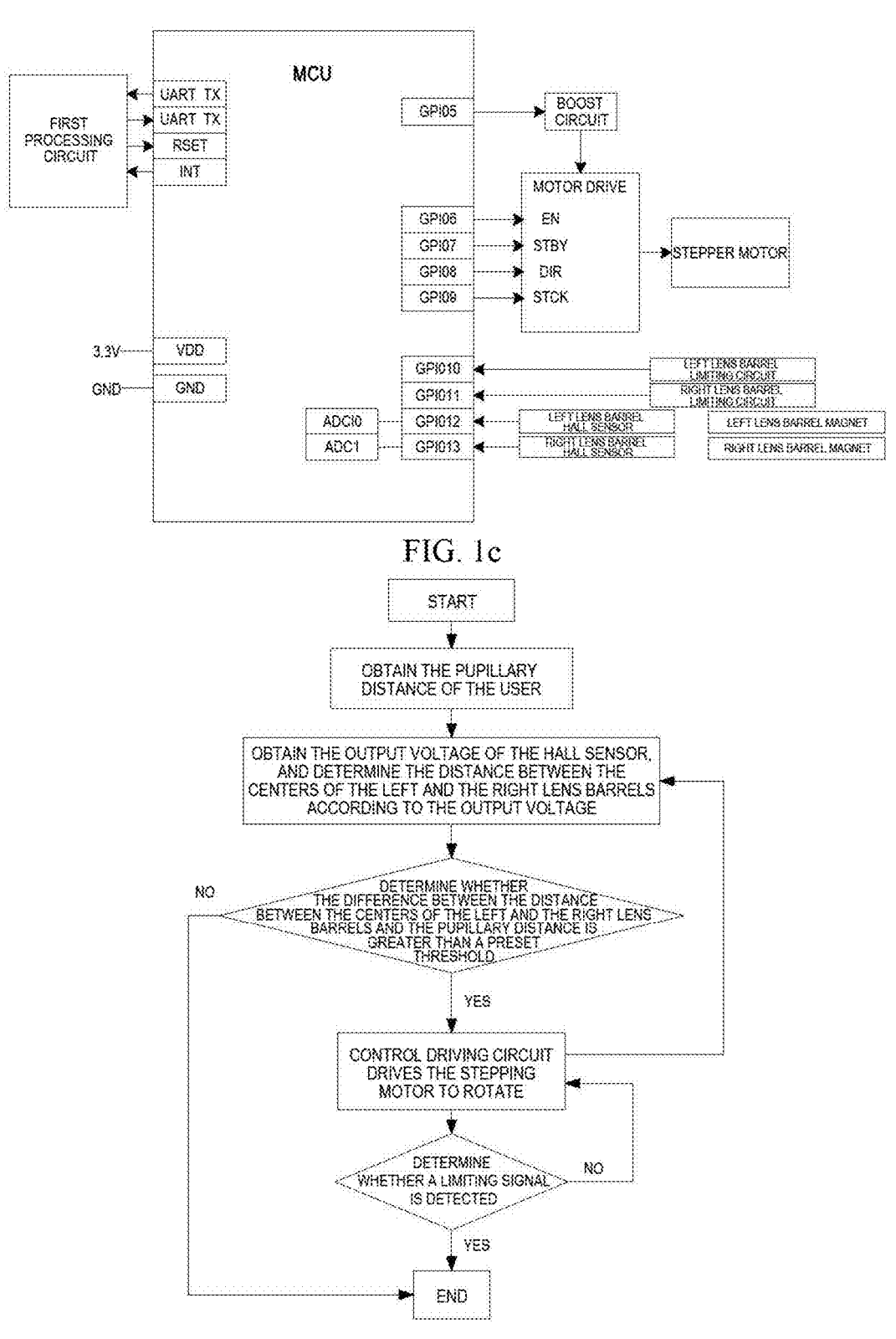
FIG. 1c is a schematic structural diagram of an apparatus for lens barrel distance adjustment provided according to another embodiment of the present disclosure.
FIG. 1d is a schematic flowchart of a method for lens barrel distance adjustment provided according to another embodiment of the present disclosure.

Further. FIG. 1c provides an example of an apparatus for lens barrel distance adjustment. Specifically, the first processing circuit 111 can determine the inter pupillary distance of the user based on eye tracking technology, and transmit the pupillary distance of the user to the MCU (i.e., the second processing circuit), the MCU can connect to the hall sensor corresponding to the left lens barrel and the hall sensor corresponding to the right lens barrel through some of its interfaces (such as GPIO12 and GPIO13), and the MCU may determine the distance between the left and right lens barrels based on the voltage of the partial interface. When the MCU determines that the difference between the distance between the left and right lens barrels and the pupillary distance of a user is greater than the predetermined threshold, the MCU may generate a corresponding control instruction according to the difference between the distance between the left and right lens barrels and the pupillary distance of the user, and the control instruction is transmitted to the motor driver (driving circuit) through another part of the interface (such as GPIO6, GPIO7, GPIO8, and GPIO9), so that the motor drives the left lens barrel and/or the right lens barrel to move through the stepper motor. Wherein, the control instruction includes: an enable signal, a standby control signal, a direction signal for indicating the rotation direction of the stepper motor, and a pulse signal. Specifically, the four signals can be transmitted to the motor drive through the EN interface, STBY interface. DIR interface, and STCK interface in the motor drive respectively. Further, the operating voltage of the MCU can be 3.3V, and the motor driver can be boosted through another interface (GPIO5) to make the motor driver work normally. Further, after receiving the output voltage transmitted by the hall sensor corresponding to the left lens barrel and the hall sensor corresponding to the right lens barrel, the MCU can perform analog-to-digital conversion on the received voltage to determine the final voltage.

Further, the connection manner between the MCU and the first processing circuit can be seen as shown in FIG. 1c, which will not be described again here.

The present solution is further explained below based on specific scenarios:

Specifically, as shown in FIG. 1d, the data processing circuit in the present disclosure can obtain the pupillary distance of the user, obtain the output voltage of the Hall sensor, determine the distance between the centers of the left and right lens barrels based on the output voltage, and determine whether the difference between the distance between the distance between the centers of the left and right lens barrels and the pupillary distance of the user is greater than the predetermined threshold, and if yes, the drive circuit is controlled to drive the stepper motor to rotate to drive the left lens barrel and/or the right lens barrel to move, so that the difference between the distance between the center of the left and right lens barrels and the pupillary distance of the user is not greater than the predetermined threshold, and if no, the process ends. After the drive circuit is controlled to drive the stepper motor to rotate, it can also be determined whether the limiting signal is detected. If yes, the process ends. If not, the drive circuit is continued to be controlled to drive the stepper motor to rotate. Among them, in the process of controlling the drive circuit to drive the stepper standby rotation, the output voltage of the hall sensor can be continued to be obtained in real time, and the distance between the center of the left and right lens barrels is determined based on the output voltage, and when the difference between the distance between the canters of the left and right lens barrels and the pupillary distance of the user is not greater than the predetermined threshold based on the output voltage of the hall sensor, the control diving circuit is stopped to drive the stepping motor to rotate.

The lens barrel distance adjustment device provided by the present disclosure specifically includes: a data processing circuit, an adjustment circuit, and a hall sensor, wherein: the hall sensor is configured to sense a magnetic induction intensity of a magnet related to a distance between left and right lens barrels of a head-mounted device, and output a corresponding first output voltage based on the magnetic induction intensity; the data processing circuit is connected to the hall sensor and the adjustment circuit and configured to obtain the first output voltage; in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction; the adjustment circuit is configured to receive the control instruction and adjust a distance between the left and right lens barrels based on the control instruction. The apparatus for lens barrel distance adjustment of the present disclosure can automatically adjust the distance between the left and right lens barrels according to the pupillary distance of the user, the efficiency of adjusting the distance between the left and right lens barrels is improved, and the user experience is also improved.

FIG. 2 is a schematic flowchart of a method for lens barrel distance adjustment provided according to an embodiment of the present disclosure. The method can be applied to a head-mounted device. The method at least includes the following steps:

S201. an eye image of a user is obtained.

S202. a pupillary distance of the user is determined based on the eye image.

S203. a first output voltage is obtained and determined by a hall sensor.

S204. in response to that the first output voltage indicates that an absolute value of a difference value between a distance between left and right lens barrels of a head-mounted device and the pupillary distance of the user is greater than a predetermined threshold, sending a control instruction corresponding to the difference value to an adjustment circuit, causing the adjustment circuit to adjust a distance between the left and right lens barrels based on the control instruction.

wherein, the hall sensor and the adjustment circuit are provided on the head-mounted device.

Optionally, after sending a control instruction corresponding to the difference value to the adjustment circuit, the method further includes:

obtaining a second output voltage output by the hall sensor;

in response to that the second output voltage indicates that an absolute value of a difference value between a distance between the left and right lens barrels and a pupillary distance of a user is not greater than the predetermined threshold, stop sending an instruction to the adjustment circuit that indicates the adjustment circuit to adjust a distance between the left and right lens barrels.

Optionally, the method further includes: stopping sending an instruction to the adjustment circuit that indicates the adjustment circuit to adjust the distance between the left and right lens barrels when a limit prompt signal is detected.

For a specific implementation corresponding to this embodiment, reference may be made to the foregoing content, and details are not described herein again.

The present disclosure further provides a head-mounted device includes: a camera group, a data processing circuit, an adjustment circuit, and a hall sensor, wherein:

The camera group is configured to take an eye image of a user.

The hall sensor is configured to sense a magnetic induction intensity of a magnet related to a distance between left and right lens barrels of a head-mounted device, and output a corresponding first output voltage based on the magnetic induction intensity.

The data processing circuit is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction.

The adjustment circuit is configured to receive the control instruction and adjust a distance between the left and right lens barrels based on the control instruction.

For a specific implementation corresponding to this embodiment, reference may be made to the foregoing content, and details are not described herein again.

FIG. 3 is a schematic structural diagram of an apparatus for lens barrel distance adjustment provided according to an embodiment of the present disclosure. The apparatus for lens barrel distance adjustment can be applied to a head-mounted device includes:

a first obtaining module configured to obtain an eye image of a user;

a determination module configured to determine a pupillary distance of the user based on the eye image;

a second obtaining module configured to obtain a first output voltage determined by a hall sensor;

a control module configured to in response to that the first output voltage indicates that an absolute value of a difference value between a distance between left and right lens barrels of a head-mounted device and the pupillary distance of the user is greater than a predetermined threshold, send a control instruction corresponding to the difference value to an adjustment circuit, causing the adjustment circuit to adjust a distance between the left and right lens barrels based on the control instruction;

wherein, the hall sensor and the adjustment circuit are provided on the head-mounted device.

Optionally, after sending the control instruction corresponding to the difference to the adjustment circuit, the apparatus is further configured to:

obtain a second output voltage output by the hall sensor;

in response to that the second output voltage indicates that an absolute value of a difference value between a distance between the left and right lens barrels and a pupillary distance of a user is not greater than the predetermined threshold, stop sending an instruction to the adjustment circuit that indicates the adjustment circuit to adjust a distance between the left and right lens barrels.

Optionally, the above device is further configured to: stop sending an instruction to the adjustment circuit that indicates the adjustment circuit to adjust the distance between the left and right lens barrels when a limit prompt signal is detected.

It should be understood that apparatus embodiments and method embodiments may correspond to each other, and similar descriptions may refer to method embodiments. To avoid repetition, details are not described herein again. Specifically, the apparatus can execute the above method embodiments, and the foregoing and other operations and/or functions of each module in the apparatus are respectively the corresponding processes in each method in the above method embodiments. For brevity, details are not described herein again.

The apparatus of embodiments of the present disclosure is described above from the perspective of functional modules in conjunction with the drawings. It should be understood that this functional module can be implemented in the form of hardware, can also be implemented through instructions in the form of software, or can also be implemented through a combination of hardware and software modules. Specifically, the steps of the method in the embodiments of the present disclosure can be completed by integrated logic circuits of hardware in the processor and/or instructions in the form of software, and steps of the method disclosed in combination with the embodiments of the present disclosure can be directly embodied as being executed and completed by a hardware decoding processing, or can be executed and completed by using a combination of hardware and software modules in a decoding processor. Optionally, the software module may be located in a mature storage medium in the field such as random access memory, flash memory, read-only memory: programmable read-only memory, electrically erasable programmable memory, register, etc. The storage medium is located in the memory, and the processor reads the information in the memory and completes the steps in the embodiments of the above method in combination with its hardware.

Figure 4:
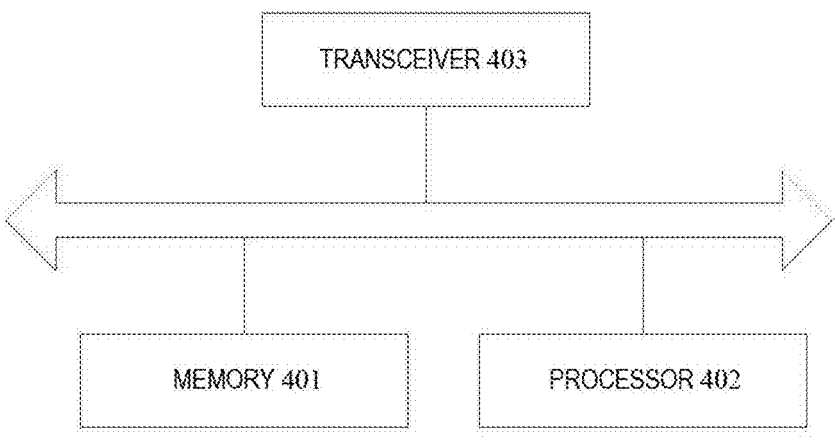
FIG. 4 is a schematic structural diagram of an electronic device provided according to the embodiments of the present disclosure.

FIG. 4 is a schematic structural diagram of an electronic device provided according to the embodiments of the present disclosure. The electronic device may include:

A memory 401 and processor 402. The memory 401 configured to store computer programs and transmit the program code to the processor 402. In other words, the processor 402 can call and run the computer program from the memory 401 to implement the methods in the embodiments of the present disclosure.

For example, the processor 402 may be configured to execute the above method embodiments according to instructions in the computer program.

In some embodiments of the present disclosure, the processor 402 may include, but is not limited to:

General processor, Digital Signal Processor (DSP), Application Specific Integrated Circuit (ASIC), Field Programmable Gate Array (FPGA) or other programmable logic devices, discrete gates or transistor logic devices, discrete hardware components, etc.

In some embodiments of the present disclosure, the memory 401 includes, but is not limited to:

Volatile memory and/or non-volatile memory. Among them, non-volatile memory can be read-only memory (ROM), programmable read-only memory (Programmable ROM, PROM), erasable programmable read-only memory (Erasable PROM, EPROM), electrically erasable programmable read-only memory (Electrically EEPROM, EEPROM) or flash memory. The volatile memory may be a random access memory (RAM), which is used as an external cache. By way of illustration, but not limitation, many forms of RAM are available, such as static random access memory (Static Ram. SRAM), dynamic random access memory (Dynamic RAM, DRAM), synchronous dynamic random access memory (Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synchronous link dynamic random access memory (synch link DRAM, SLDRAM) and Direct Rambus RAM (DR RAM).

In some embodiments of the present disclosure, the computer program can be divided into one or more modules, and the one or more modules are stored in the memory 401 and executed by the processor 402 to complete the methods provided in the present disclosure. The one or more modules may be a series of computer program instruction segments capable of completing specific functions. The instruction segment is used to describe the execution process of the computer program in the electronic device.

As shown in FIG. 4, the electronic device may further include:

Transceiver 403, the transceiver 403 can be connected to the processor 402 or the memory 401.

Wherein the processor 402 can control the transceiver 403 to communicate with other devices. Specifically, it can send information or data to other devices, or receive information or data sent by other devices. The transceiver 403 may include a transmitter and a receiver. The transceiver 403 may further include an antenna, and the number of antenna may be one or more.

It should be understood that various components in the electronic device are connected through a bus system, where in addition to the data bus, the bus system also includes a power bus, a control bus and a status signal bus.

The present disclosure further provides a computer storage medium on which a computer program is stored. When the computer program is executed by a computer, the computer can execute the method of the above method embodiments. In other words, the embodiments of the present disclosure further provide a computer program product including instructions, when the instructions are executed by a computer, cause the computer to perform the method of the above-mentioned method embodiments.

When software is used to implement, all or some of the embodiments may be implemented in a form of a computer program product. The computer program product includes one or more computer instructions. When the computer program instructions are loaded and executed on a computer, the processes or functions according to the embodiments of the present disclosure are all or partially generated. The computer may be a general-purpose computer, a special purpose computer, a computer network, or other programmable device. The computer instructions may be stored in or transmitted from one computer-readable storage medium to another computer-readable storage medium, for example, the computer instructions may be transmitted from a website, computer, server, or data center in a wired (such as coaxial cable, optical fiber, digital subscriber line (DSL) or wireless (such as infrared, wireless, microwave, etc.) manner to another website, computer, server or data center. The computer-readable storage medium can be any available medium that can be accessed by a computer or a data storage device such as a server or data center integrated with one or more available media. The available media may be magnetic media (e.g., floppy disk, hard disk, magnetic tape), optical media (e.g., digital video disc (DVD)), or semiconductor media (e.g., solid state disk (SSD)), etc.

According to one or more embodiments of the present disclosure, an apparatus for lens barrel distance adjustment is provided, the apparatus includes: a data processing circuit, an adjustment circuit, and a hall sensor, wherein:

The hall sensor is configured to sense a magnetic induction intensity of a magnet related to a distance between left and right lens barrels of a head-mounted device, and output a corresponding first output voltage based on the magnetic induction intensity.

The data processing circuit is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction.

The adjustment circuit is configured to receive the control instruction and adjust a distance between the left and right lens barrels based on the control instruction.

According to one or more embodiments of the present disclosure, the adjustment circuit is configured to adjust a distance between the left and right lens barrels based on the control instruction and drive the left lens barrel and/or the right lens barrel to move based on the control instruction.

According to one or more embodiments of the present disclosure, the adjustment circuit comprises a driving circuit and a stepper motor; wherein:

The driving circuit is connected to the data processing circuit and the stepper motor and configured to receive the control instruction and generate a corresponding driving signal based on the control instruction.

The stepper motor is configured to drive the left lens barrel and/or the right lens barrel to move based on the driving signal.

According to one or more embodiments of the present disclosure, the data processing circuit comprises: a first processing circuit and a second processing circuit, wherein:

The first processing circuit is connected to a camera group and the second processing circuit and configured to obtain an eye image of user from the camera group and determine a pupillary distance of a user based on the eye image.

The second processing circuit is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction.

According to one or more embodiments of the present disclosure, the apparatus for lens barrel distance adjustment further comprises: a limiting circuit.

The limiting circuit is connected to the data processing circuit and the left lens barrel and/or the right lens barrel and configured to generate a corresponding limit prompt signal when the left lens barrel and/or the right lens barrel move to a corresponding limit position:

The data processing circuit is further configured to stop sending the control instruction to the adjustment circuit when the limit prompt signal is detected.

According to one or more embodiments of the present disclosure, the data processing circuit is further configured to:

after sending the control instruction corresponding to the difference value to the adjustment circuit, obtain a second output voltage output by the hall sensor; in response to that the second output voltage indicates that an absolute value of a difference value between a distance between the left and right lens barrels and a pupillary distance of a user is not greater than the predetermined threshold, stop sending an instruction to the adjustment circuit that indicates the adjustment circuit to adjust a distance between the left and right lens barrels.

According to one or more embodiments of the present disclosure, a method for lens barrel distance adjustment is provided, the method includes:

an eye image of a user is obtained.

a pupillary distance of the user is determined based on the eye image;

a first output voltage is obtained and determined by a hall sensor;

in response to that the first output voltage indicates that an absolute value of a difference value between a distance between left and right lens barrels of a head-mounted device and the pupillary distance of the user is greater than a predetermined threshold, sending a control instruction corresponding to the difference value to an adjustment circuit, causing the adjustment circuit to adjust a distance between the left and right lens barrels based on the control instruction;

wherein, the hall sensor and the adjustment circuit are provided on the head-mounted device.

According to one or more embodiments of the present disclosure, after sending a control instruction corresponding to the difference value to the adjustment circuit, the method further includes:

a second output voltage output is obtained by the hall sensor;

in response to that the second output voltage indicates that an absolute value of a difference value between a distance between the left and right lens barrels and a pupillary distance of a user is not greater than the predetermined threshold, stop sending an instruction to the adjustment circuit that indicates the adjustment circuit to adjust a distance between the left and right lens barrels.

According to one or more embodiments of the present disclosure, the method further comprises: sending an instruction is stopped to the adjustment circuit that indicates the adjustment circuit to adjust the distance between the left and right lens barrels when a limit prompt signal is detected.

According to one or more embodiments of the present disclosure, a head-mounted device is provided, the head-mounted device includes: a camera group, a data processing circuit, an adjustment circuit, and a hall sensor, wherein:

The camera group is configured to take an eye image of a user.

The hall sensor is configured to sense a magnetic induction intensity of a magnet related to a distance between left and right lens barrels of a head-mounted device, and output a corresponding first output voltage based on the magnetic induction intensity.

The data processing circuit is connected to the hall sensor and the adjustment circuit and configured to obtain the first output voltage: in response to that the first output voltage indicates that an absolute value of a difference value between a distance between the left and right lens barrels and a pupillary distance of a user is greater than a predetermined threshold, send a control instruction corresponding to the difference value to the adjustment circuit, causing the adjustment circuit to adjust a distance between the left and right lens barrels based on the control instruction.

the adjustment circuit is configured to receive the control instruction and adjust a distance between the left and right lens barrels based on the control instruction.

According to one or more embodiments of the present disclosure, an apparatus for lens barrel distance adjustment is provided, the apparatus includes:

a first obtaining module configured to obtain an eye image of a user;

a determination module configured to determine a pupillary distance of the user based on the eye image;

a second obtaining module configured to obtain a first output voltage determined by a hall sensor;

a control module configured to in response to that the first output voltage indicates that an absolute value of a difference value between a distance between left and right lens barrels of a head-mounted device and the pupillary distance of the user is greater than a predetermined threshold, send a control instruction corresponding to the difference value to an adjustment circuit, causing the adjustment circuit to adjust a distance between the left and right lens barrels based on the control instruction;

wherein, the hall sensor and the adjustment circuit are provided on the head-mounted device.

According to one or more embodiments of the present disclosure, an electronic device is provided, the electronic device includes:

a processor; and a memory configured to store executable instruction of the processor;

Wherein, the processor is configured to execute an above method by executing the executable instructions.

According to one or more embodiments of the present disclosure, a computer-readable storage medium is provided, on which a computer program is stored, and the computer program when executed by a processor, the above method is implemented.

According to one or more embodiments of the present disclosure, a computer program product is provided, including a computer program, the computer program when executed by a processor, the above method is implemented.

Those of ordinary skill in the art can appreciate that the modules and algorithm steps of each example described in conjunction with the embodiments disclosed herein can be implemented with electronic hardware, or a combination of computer software and electronic hardware. Whether these functions are performed in hardware or software depends on the specific application and design constraints of the technical solution. Skilled artisans may implement the described functionality using different methods for each specific application, but such implementations should not be considered to be beyond the scope of this disclosure.

Among the several embodiments provided in this disclosure, it should be understood that the disclosed systems, apparatuses and methods can be implemented in other ways. For example, the apparatus embodiments described above are only illustrative. For example, the division of the modules is only a logical function division. In actual implementation, there may be other division methods. For example, multiple modules or components may be combined or integrated, to another system, or some features can be ignored, or not implemented. On the other hand, the coupling or direct coupling or communication connection between each other shown or discussed may be through some interfaces, indirect coupling or communication connection of apparatuses or modules, and may be in electrical, mechanical or other forms.

The modules described as separate components may or may not be physically separated, and components shown as modules may or may not be physical modules, that is, they may be located in one place, or they may be distributed to multiple network units. Some or all of the modules may be selected according to actual needs to achieve the purpose of the embodiments solution. For example, each functional module in each embodiment of the present disclosure can be integrated into one processing module, or each module can exist physically alone, or two or more modules can be integrated into one module.

The above is only the detailed description of the present disclosure, but the protection scope of the present disclosure is not limited thereto. Any skilled person familiar with this field can easily think of changes or substitutions within the technical scope disclosed in the present disclosure, and they should be covered by this disclosure within the scope of protection. Therefore, the protection scope of the present disclosure shall be subject to the protection scope of these claims.

We claim:

1. An apparatus for lens barrel distance adjustment, comprising: a data processing circuit, an adjustment circuit, and a hall sensor, wherein:

the hall sensor is configured to sense a magnetic induction intensity of a magnet related to a distance between left and right lens barrels of a head-mounted device, and output a corresponding first output voltage based on the magnetic induction intensity;

the data processing circuit is connected to the hall sensor and the adjustment circuit and configured to obtain the first output voltage; in response to that the first output voltage indicates that an absolute value of a difference value between a distance between the left and right lens barrels and a pupillary distance of a user is greater than a predetermined threshold, send a control instruction to the adjustment circuit, causing the adjustment circuit to adjust a distance between the left and right lens barrels based on the control instruction;

the adjustment circuit is configured to receive the control instruction and adjust a distance between the left and right lens barrels based on the control instruction.

2. The apparatus for lens barrel distance adjustment of claim 1, wherein the adjustment circuit is configured to adjust a distance between the left and right lens barrels based on the control instruction and drive the left lens barrel and/or the right lens barrel to move based on the control instruction.

3. The apparatus for lens barrel distance adjustment of claim 2, wherein the adjustment circuit comprises a driving circuit and a stepper motor; wherein:

the driving circuit is connected to the data processing circuit and the stepper motor and configured to receive the control instruction and generate a corresponding driving signal based on the control instruction;

the stepper motor is configured to drive the left lens barrel and/or the right lens barrel to move based on the driving signal.

4. The apparatus for lens barrel distance adjustment of claim 1, wherein the data processing circuit comprises: a first processing circuit and a second processing circuit, wherein:

the first processing circuit is connected to a camera group and the second processing circuit and configured to obtain an eye image of user from the camera group and determine a pupillary distance of a user based on the eye image;

the second processing circuit is connected to the hall sensor and the adjustment circuit and configured to obtain the first output voltage; in response to that the first output voltage indicates that an absolute value of a difference value between a distance between the left and right lens barrels and a pupillary distance of a user is greater than a predetermined threshold, send a control instruction to the adjustment circuit, causing the adjustment circuit to adjust a distance between the left and right lens barrels based on the control instruction.

5. The apparatus for lens barrel distance adjustment of claim 1, wherein the apparatus for lens barrel distance adjustment further comprises: a limiting circuit;

the limiting circuit is connected to the data processing circuit and the left lens barrel and/or the right lens barrel and configured to generate a corresponding limit prompt signal when the left lens barrel and/or the right lens barrel move to a corresponding limit position;

the data processing circuit is further configured to stop sending the control instruction to the adjustment circuit when the limit prompt signal is detected.

6. The apparatus for lens barrel distance adjustment of claim 1, wherein the data processing circuit is further configured to:

after sending the control instruction to the adjustment circuit, obtain a second output voltage output by the hall sensor; in response to that the second output voltage indicates that an absolute value of a difference value between a distance between the left and right lens barrels and a pupillary distance of a user is not greater than the predetermined threshold, stop sending an instruction to the adjustment circuit that indicates the adjustment circuit to adjust a distance between the left and right lens barrels.

7. The apparatus for lens barrel distance adjustment of claim 1, wherein the data processing circuit is further configured to:

store a corresponding relationship between different first output voltages and the corresponding distances between the left and the right lens barrels; determine the distance between the left and right lens barrels corresponding to the first output voltage based on the corresponding relationship.

8. A method for adjusting a lens barrel distance, comprising:

obtaining a pupillary distance of a user;

obtaining a first output voltage determined by a hall sensor;

in response to that the first output voltage indicates that an absolute value of a difference value between a distance between left and right lens barrels of a head-mounted device and the pupillary distance of the user is greater than a predetermined threshold, sending a control instruction to an adjustment circuit, causing the adjustment circuit to adjust a distance between the left and right lens barrels based on the control instruction;

wherein, the hall sensor and the adjustment circuit are provided on the head-mounted device.

9. The method of claim 8, wherein after sending a control instruction to the adjustment circuit, the method further comprises:

obtaining a second output voltage output by the hall sensor;

in response to that the second output voltage indicates that an absolute value of a difference value between a distance between the left and right lens barrels and a pupillary distance of a user is not greater than the predetermined threshold, stop sending an instruction to the adjustment circuit that indicates the adjustment circuit to adjust a distance between the left and right lens barrels.

10. The method of claim 8, wherein the method further comprises: stopping sending an instruction to the adjustment circuit that indicates the adjustment circuit to adjust the distance between the left and right lens barrels when a limit prompt signal is detected.

11. A head-mounted device, comprising: a camera group, a data processing circuit, an adjustment circuit, and a hall sensor, wherein:

the camera group is configured to take an eye image of a user;

the hall sensor is configured to sense a magnetic induction intensity of a magnet related to a distance between left and right lens barrels of a head-mounted device, and output a corresponding first output voltage based on the magnetic induction intensity;

the data processing circuit is connected to the hall sensor and the adjustment circuit and configured to obtain the first output voltage; in response to that the first output voltage indicates that an absolute value of a difference value between a distance between the left and right lens barrels and a pupillary distance of a user is greater than a predetermined threshold, send a control instruction to the adjustment circuit, causing the adjustment circuit to adjust a distance between the left and right lens barrels based on the control instruction;

the adjustment circuit is configured to receive the control instruction and adjust a distance between the left and right lens barrels based on the control instruction.

12. The head-mounted device of claim 11, wherein the adjustment circuit is configured to adjust a distance between the left and right lens barrels based on the control instruction and drive the left lens barrel and/or the right lens barrel to move based on the control instruction.

13. The head-mounted device of claim 12, wherein the adjustment circuit comprises a driving circuit and a stepper motor; wherein:

the driving circuit is connected to the data processing circuit and the stepper motor and configured to receive the control instruction and generate a corresponding driving signal based on the control instruction;

the stepper motor is configured to drive the left lens barrel and/or the right lens barrel to move based on the driving signal.

14. The head-mounted device of claim 11, wherein the data processing circuit comprises: a first processing circuit and a second processing circuit, wherein:

the first processing circuit is connected to a camera group and the second processing circuit and configured to obtain an eye image of user from the camera group and determine a pupillary distance of a user based on the eye image;

the second processing circuit is connected to the hall sensor and the adjustment circuit and configured to obtain the first output voltage; in response to that the first output voltage indicates that an absolute value of a difference value between a distance between the left and right lens barrels and a pupillary distance of a user is greater than a predetermined threshold, send a control instruction to the adjustment circuit, causing the adjustment circuit to adjust a distance between the left and right lens barrels based on the control instruction.

15. The head-mounted device of claim 11, wherein the apparatus for lens barrel distance adjustment further comprises: a limiting circuit;

the limiting circuit is connected to the data processing circuit and the left lens barrel and/or the right lens barrel and configured to generate a corresponding limit prompt signal when the left lens barrel and/or the right lens barrel move to a corresponding limit position;

the data processing circuit is further configured to stop sending the control instruction to the adjustment circuit when the limit prompt signal is detected.

16. The head-mounted device of claim 11, wherein the data processing circuit is further configured to:

after sending the control instruction to the adjustment circuit, obtain a second output voltage output by the hall sensor; in response to that the second output voltage indicates that an absolute value of a difference value between a distance between the left and right lens barrels and a pupillary distance of a user is not greater than the predetermined threshold, stop sending an instruction to the adjustment circuit that indicates the adjustment circuit to adjust a distance between the left and right lens barrels.

17. The head-mounted device of claim 11, wherein the data processing circuit is further configured to:

store a corresponding relationship between different first output voltages and the corresponding distances between the left and the right lens barrels; determine the distance between the left and right lens barrels corresponding to the first output voltage based on the corresponding relationship.

\* \* \* \* \*